United States Patent
Nou et al.

(10) Patent No.: US 11,891,963 B2
(45) Date of Patent: Feb. 6, 2024

(54) ENGINE CONTROLLING METHOD AND ENGINE SYSTEM

(71) Applicant: Mazda Motor Corporation, Hiroshima (JP)

(72) Inventors: Yoshihisa Nou, Aki-gun (JP); Fumihiko Saito, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/895,876

(22) Filed: Aug. 25, 2022

(65) Prior Publication Data

US 2023/0077080 A1 Mar. 9, 2023

(30) Foreign Application Priority Data

Sep. 7, 2021 (JP) .................................. 2021-145488

(51) Int. Cl.
*F02D 41/40* (2006.01)
*F02D 13/02* (2006.01)
*F02D 41/00* (2006.01)
*F02D 41/38* (2006.01)

(52) U.S. Cl.
CPC ....... *F02D 41/401* (2013.01); *F02D 13/0234* (2013.01); *F02D 41/009* (2013.01); *F02D 2041/389* (2013.01); *F02D 2200/024* (2013.01)

(58) Field of Classification Search
CPC ........... F02D 13/0234; F02D 2041/389; F02D 2200/024; F02D 2200/0612; F02D 35/023; F02D 35/028; F02D 41/0025; F02D 41/009; F02D 41/062; F02D 41/2477; F02D 41/40; F02D 41/401
See application file for complete search history.

(56) References Cited

U.S. PATENT DOCUMENTS

| | | | | |
|---|---|---|---|---|
| 4,995,351 | A * | 2/1991 | Ohkubo | F02D 41/345 123/90.11 |
| 8,397,550 | B2 * | 3/2013 | Huber | G01N 33/2817 73/114.38 |
| 8,763,582 | B2 * | 7/2014 | Lewis | F02N 11/08 123/179.5 |
| 10,815,917 | B2 * | 10/2020 | Fujiwara | F02D 35/023 |

(Continued)

FOREIGN PATENT DOCUMENTS

| JP | 2014234727 A | 12/2014 | | |
|---|---|---|---|---|
| JP | 2023-38653 | * | 3/2023 | F02D 45/00 |

*Primary Examiner* — Carl C Staubach
(74) *Attorney, Agent, or Firm* — Alleman Hall Creasman & Tuttle LLP

(57) ABSTRACT

A method of controlling an engine is provided, which includes the steps of, during motoring of the engine, injecting, by an injector, fuel for analysis into a cylinder at a specific timing after an intake valve of the cylinder of the engine is closed, outputting to a controller, by an in-cylinder pressure sensor, a signal corresponding to a pressure inside the cylinder at least at a timing when a specific crank angle period has passed from the fuel injection timing, and determining, by the controller, a property of the fuel injected by the injector, by comparing a pressure value measured by the in-cylinder pressure sensor with a reference pressure value inside the cylinder measured at a timing when the specific crank angle period has passed after a standard fuel is injected into the cylinder at the specific timing.

11 Claims, 5 Drawing Sheets

(56) References Cited

U.S. PATENT DOCUMENTS

| | | | |
|---|---|---|---|
| 11,143,137 B1* | 10/2021 | Kim | F02D 13/0234 |
| 11,306,668 B1* | 4/2022 | Fulton | F02D 13/0207 |
| 11,326,547 B1* | 5/2022 | Ota | F02D 41/402 |
| 2003/0221421 A1* | 12/2003 | Gui | F02D 41/0002 |
| | | | 60/285 |
| 2007/0079647 A1* | 4/2007 | Aoyama | F02D 19/0636 |
| | | | 73/35.02 |
| 2017/0009698 A1* | 1/2017 | Tsugawa | F02B 23/104 |
| 2018/0038306 A1* | 2/2018 | Ota | F02D 41/3023 |
| 2022/0003185 A1* | 1/2022 | Ohata | F02P 5/152 |
| 2023/0069837 A1* | 3/2023 | Nou | F02D 41/062 |
| 2023/0077202 A1* | 3/2023 | Nou | F02D 35/028 |

* cited by examiner

ENGINE CONTROLLING METHOD AND ENGINE SYSTEM

TECHNICAL FIELD

The present disclosure relates to a method of controlling an engine and an engine system.

BACKGROUND OF THE DISCLOSURE

JP2014-234727A discloses a technique for creating a heat release rate waveform of a low-temperature oxidation reaction, after fuel is injected into a cylinder, by setting a reaction start timing of fuel according to a period during which the fuel floats so as to be on a more advancing side (the lower temperature side of a reaction startable temperature of the low-temperature oxidation reaction) as the floating period is longer. According to this technique, the combustion state can be diagnosed with sufficient accuracy.

Meanwhile, various additives are contained in the fuel supplied to automobile engines, and the type and the combination rate of the additives are different for different manufacturers. Therefore, the properties of the fuel supplied to the automobile engines are not always the same. In some cases, biofuel may be supplied to the engines. The property of the biofuel may be completely different from the property of the fossil fuel. In the future, it is expected that fuel of various properties will be supplied to engines.

On the other hand, a controller of the engine controls the engine by setting beforehand a fuel injection timing and a fuel injection amount which are used for optimal combustion based on the property of a standard fuel. If the property of fuel supplied to the automobile is different from the standard fuel, it may cause misfire or rapid combustion. Therefore, there is a demand of accurately determining the property of fuel supplied to the engine.

SUMMARY OF THE DISCLOSURE

The technique disclosed herein enables a determination of the property of fuel supplied to an engine with sufficient accuracy.

According to one aspect of the present disclosure, a method of controlling an engine is provided. The method includes injecting, during motoring of the engine, by an injector, fuel for analysis into a cylinder at a specific timing after an intake valve of the cylinder of the engine is closed. The method includes outputting to a controller, by an in-cylinder pressure sensor, a signal corresponding to a pressure inside the cylinder at least at a timing when a specific crank angle period has passed from the fuel injection timing. The method includes determining, by the controller, a property of the fuel injected by the injector, by comparing a pressure value measured by the in-cylinder pressure sensor with a reference pressure value inside the cylinder measured at a timing when the specific crank angle period has passed after a standard fuel is injected into the cylinder at the specific timing.

According to the configuration, the injector injects the fuel for analysis into the cylinder during motoring of the engine. Here, "motoring of the engine" refers to a state where a crankshaft of the engine starts rotation by a drive source outside of the engine, such as a generator, an electric motor, or a starter motor. The motoring of the engine corresponds to a startup of the engine. The startup of the engine corresponds to, in the case of engine vehicles, when an ignition switch of an automobile being turned on by a person onboard, or, in the case of hybrid vehicles, when an engine is started for, for example, a demand of generating power, and satisfying a demand torque.

During motoring of the engine, intake stroke, compression stroke, expansion stroke, and exhaust stroke are performed inside the cylinder, by an external driving force. The injector injects the fuel for analysis into the cylinder at the specific timing during compression stroke after the intake valve is closed. The "fuel for analysis" may be a small amount of fuel with which a high-temperature oxidation reaction does not occur even when a piston reaches a compression top dead center. The "fuel for analysis" is fuel to be supplied into the cylinder in order to determine the property of the fuel.

The pressure inside the cylinder gradually rises accompanied by the progress of compression stroke. The fuel injected into the cylinder results in the low-temperature oxidation reaction according to the progress of time. If the property of fuel (for example, a ratio of specific heat and/or a gas constant of fuel) differs, the amount of heat released also differs. That is, since the initial chemical reaction is different in a preparatory step of the low-temperature oxidation reaction (for example, an in-cylinder gas temperature is 700 K), the amount of heat released is different. The initial chemical reaction is radical (alkylperoxy RO2, QOOHO2) generation by a hydrogen abstraction reaction. The difference in the amount of heat released causes a difference in the rate of pressure increase inside the cylinder.

The in-cylinder pressure sensor outputs to the controller the signal corresponding to the pressure inside the cylinder at the timing when the specific crank angle period has passed from the fuel injection timing. If the fuel injected from the injector is fuel which easily generates heat, the pressure value is relatively high. On the other hand, if the fuel does not easily generate heat, the pressure value is relatively low.

The controller stores the reference pressure value of the standard fuel in advance. The "standard fuel" is, for example, fuel corresponding to K2202 (Motor Gasoline) or K2204 (Diesel Fuel) defined by Japanese Industrial Standards (JIS). The reference pressure value of the standard fuel is the pressure value inside the cylinder at the timing when the specific crank angle period has passed after the standard fuel is injected into the cylinder at the specific timing. Further, the controller compares the pressure value measured by the in-cylinder pressure sensor with the reference pressure value of the standard fuel.

In detail, if the measured pressure value is higher than the reference pressure value, the fuel injected from the injector easily generates heat, which easily causes the low-temperature oxidation reaction. Therefore, this type of fuel will easily cause the high-temperature oxidation reaction under the engine operation after the startup is finished (that is, when the engine operates by the fuel injected into the cylinder being combusted, unlike the motoring). In this case, the combustion inside the cylinder tends to be rapid and combustion noise tends to increase.

On the other hand, if the measured pressure value is lower than the reference pressure value of the standard fuel, the fuel injected from the injector does not easily generate heat, which does not easily cause the low-temperature oxidation reaction. Therefore, this type of fuel does not easily cause the high-temperature oxidation reaction under the engine operation after the startup is finished, and as a result, the combustion may be slow. This may lead to a reduction in engine torque and the degradation of fuel efficiency.

This technique is made by focusing on the idea that the amount of heat released varies depending on fuel. The controller compares the pressure values at the timing when the specific crank angle period has passed after the fuel injection timing, based on the rate of pressure increase inside the cylinder varying according to the heat release amount of the fuel injected into the cylinder. The controller can determine the property of fuel supplied to the engine with sufficient accuracy.

Notably, the determination of the fuel property is performed during motoring of the engine. Since the high-temperature oxidation reaction of fuel does not occur under these circumstances, the controller can determine the fuel property without being influenced by heat or residual gas. Thus, the controller can determine more accurately the property of fuel supplied to the engine.

The cylinder may be one of a plurality of cylinders, and the cylinder into which the injector injects the fuel for analysis may be the cylinder, out of the plurality of cylinders, whose the intake valve is closed first after a crankshaft of the engine starts rotation.

The rotation speed of the crankshaft gradually increases accompanied by the progress of the engine cycle, and accordingly, the in-cylinder temperature gradually increases. When the in-cylinder temperature increases, the determination of the fuel property may be influenced by heat.

According to this configuration, since the determination of the fuel property is performed inside the cylinder whose intake valve is closed first after the crankshaft of the engine starts rotation, the controller can determine the fuel property without being influenced by heat or residual gas.

The injector may inject the fuel for analysis to each of the plurality of cylinders as a cycle of the engine progresses. The in-cylinder pressure sensor may output the pressure values of the plurality of cylinders. The controller may compare an average value of the plurality of pressure values with the reference pressure value to determine the property.

According to this configuration, the determination accuracy improves by the controller using the average value of the plurality of pressure values to determine the fuel property.

The specific crank angle period may become shorter as the cycle progresses.

As described above, the in-cylinder temperature gradually increases accompanied by the progress of the engine cycle. The temperature increase inside the cylinder makes the fuel injected into the cylinder more reactive, which promotes the pressure increase inside the cylinder. By the specific crank angle period becoming shorter as the cycle progresses, the pressure value from which the influence of the temperature increase in each of the cycles is eliminated, can be measured. Thus, the controller can further accurately determine the fuel property based on the plurality of pressure values.

The specific crank angle period may correspond to a period during which the fuel injected into the cylinder from the injector achieves a low-temperature oxidation reaction.

As described above, this technique is for determining the fuel property by making use of the fact that the heat release amount in the initial chemical reaction is different. By corresponding the specific crank angle period from the fuel injection timing to the measuring timing of the pressure, to the period during which the fuel reaches the low-temperature oxidation reaction, the in-cylinder pressure sensor can measure the pressure value to which the heat release amount in the initial chemical reaction is reflected. The controller can determine the fuel property with sufficient accuracy using the pressure value. Note that the specific crank angle period may be set as a period until the piston inside the cylinder reaches a compression top dead center After a startup of the engine is finished, the controller may correct at least one of a fuel injection amount and a close timing of the intake valve according to the property of the fuel.

When the fuel injected from the injector easily causes the low-temperature oxidation reaction, the high-temperature oxidation reaction occurs more easily, which may cause the rapid combustion. When the fuel injected from the injector does not easily cause the low-temperature oxidation reaction, the high-temperature oxidation reaction occurs less easily, which may cause the slow combustion.

According to this configuration, since the controller corrects at least one of the fuel injection amount and the close timing of the intake valve according to the property of the fuel, the fuel is regarded to be standardized regardless of the fuel property. That is, it can make the combustion equivalent to the combustion with the standard fuel regardless of the fuel property. It becomes advantageous for the improvement in fuel efficiency of the engine and the improvement in emission gas performance. Further, the increase in combustion noise can be suppressed.

The controller may correct the close timing of the intake valve to a retarding side when the measured pressure value is higher than the reference pressure value, and correct the close timing of the intake valve to an advancing side when the measured pressure value is lower than the reference pressure value.

When the measured pressure value is higher than the reference pressure value, this fuel is relatively easy to generate heat. Thus, the close timing of the intake valve is corrected to the retarding side. When the close timing of the intake valve is retarded, since the temperature inside the cylinder drops, the fuel becomes difficult to generate heat. Even if it is the fuel which is easy to generate heat, this combustion becomes equivalent to the combustion with the standard fuel. On the contrary, when the measured pressure value is lower than the reference pressure value, this fuel is relatively difficult to generate heat. Thus, the close timing of the intake valve is corrected to the advancing side. When the close timing of the intake valve is advanced, since the temperature inside the cylinder increases, the fuel becomes easier to generate heat. Even if it is the fuel which is difficult to generate heat, this combustion becomes equivalent to the combustion with the standard fuel. Note that the close timing of the intake valve is set after an intake bottom dead center.

The controller may correct the close timing of the intake valve so that the close timing of the intake valve is retarded more when the measured pressure value becomes higher than the reference pressure value. When the valve close timing reaches a maximum retard amount, the controller may correct the fuel injection amount so that the fuel injection amount decreases when the measured pressure value becomes higher than the reference pressure value.

According to this configuration, by correcting the close timing of the intake valve to be retarded more when the measured pressure value becomes higher than the reference pressure value, the temperature inside the cylinder is adjusted according to the fuel property (i.e., the temperature decreases). However, when the close timing of the intake valve reaches the maximum retard amount, it is hard to decrease the temperature inside the cylinder any further even if the close timing of the intake valve is retarded further. Thus, the controller does not retard the close timing of the intake valve beyond the maximum retard amount, but alternatively, the controller reduces the fuel injection amount.

Since the heat release amount decreases accordingly, the combustion becomes equivalent to the combustion with the standard fuel.

According to another aspect of the present disclosure, an engine system including an engine is provided, which includes a controller that stores information regarding a property of a standard fuel, an injector that injects fuel into a cylinder of the engine, in response to a control signal from the controller, an in-cylinder pressure sensor that is attached to the engine, and outputs to the controller a pressure signal corresponding to a pressure inside the cylinder, and a crank angle sensor that is attached to the engine, and outputs to the controller a crank angle signal corresponding to a crank angle of the engine. During motoring of the engine, the controller causes the injector to inject fuel for analysis at a specific timing after an intake valve of the cylinder is closed. The controller acquires a pressure value inside the cylinder at a timing when a specific crank angle period has passed from the fuel injection timing, based on the crank angle signal of the crank angle sensor and the pressure signal of the in-cylinder pressure sensor. The information stored in the controller includes a reference pressure value inside the cylinder at a timing when the specific crank angle period has passed after the standard fuel is injected into the cylinder at the specific timing. The controller determines the property of the fuel injected by the injector, based on a comparison of the acquired pressure value with the reference pressure value.

According to this configuration, the controller can determine the property of fuel supplied to the engine, with sufficient accuracy, during motoring of the engine.

DETAILED DESCRIPTION OF THE DISCLOSURE

Hereinafter, one embodiment of a method of controlling an engine and an engine system is described with reference to the accompanying drawings. The controlling method and the engine system which are described herein are merely illustration.

Figure 1:
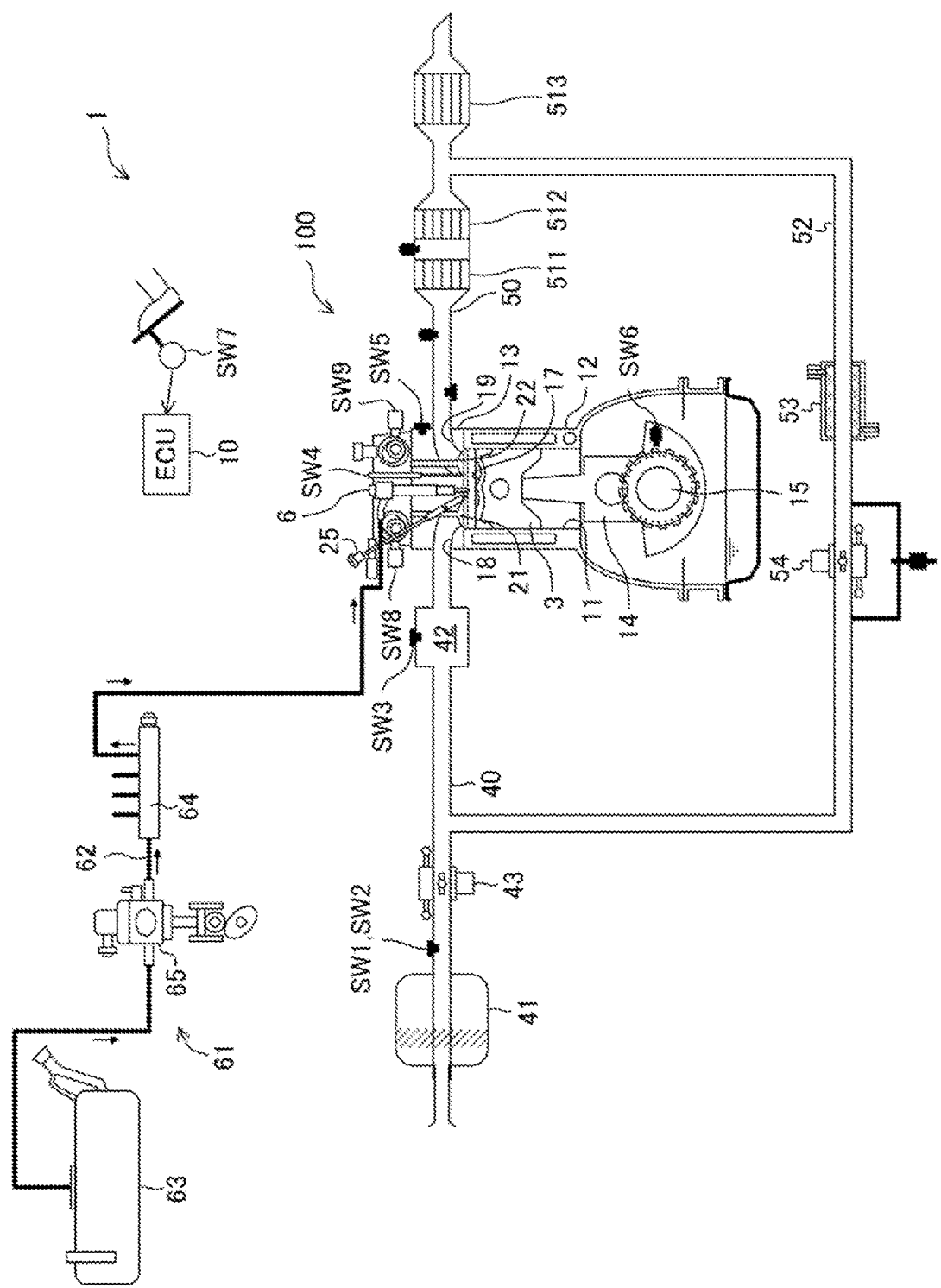
FIG. 1 illustrates an engine system.
Figure 2:
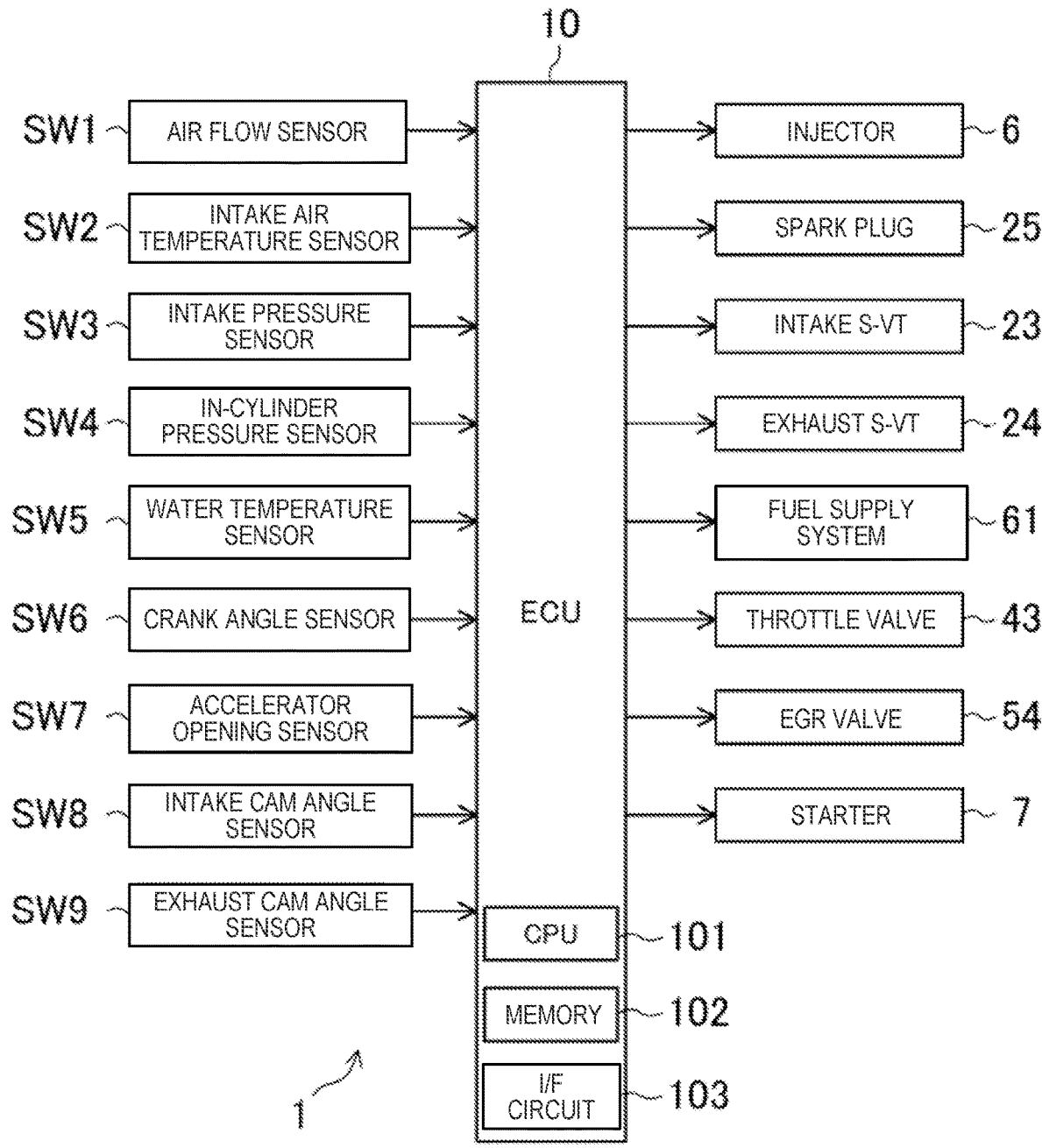
FIG. 2 illustrates the engine system.

FIG. 1 is a view illustrating an engine system 1. The engine system 1 is mounted on a four-wheeled automobile. The engine system 1 includes an engine 100 and a controller which controls the engine 100. The controller is an ECU (Engine Control Unit) 10 which will be described later. FIG. 2 is a block diagram illustrating a configuration related to the control of the engine system 1.

The engine 100 has a cylinder 11. Inside the cylinder 11, intake stroke, compression stroke, expansion stroke, and exhaust stroke are repeated. The engine 100 is a four-stroke engine. The automobile is propelled by the engine 100 in operation. Fuel of the engine 100 is gasoline in this example configuration. The engine 100 may be configured so that a mixture gas combusts by self-ignition in at least a part of the operating range. Note that the fuel of the engine 100 may be diesel fuel.

(Configuration of Engine)

The engine 100 includes a cylinder block 12 and a cylinder head 13. A plurality of cylinders 11 are formed in the cylinder block 12. The engine 100 is a multi-cylinder engine. In FIG. 1, only one cylinder 11 is illustrated.

A piston 3 is inserted in each cylinder 11. The piston 3 is coupled to a crankshaft 15 via a connecting rod 14. The piston 3, the cylinder 11, and the cylinder head 13 form a combustion chamber 17.

The geometric compression ratio of the engine system 1 is set to a high value for the purpose of improvement in theoretical thermal efficiency. In detail, the geometric compression ratio c of the engine system 1 is 14.0:1.0 or higher. The geometric compression ratio may be 18:1, for example. The geometric compression ratio may be set suitably within a range of 14:1 or higher and 20:1 or lower.

An intake port 18 is formed in the cylinder head 13 for every cylinder 11. The intake port 18 communicates with the inside of the cylinder 11.

An intake valve 21 is disposed at the intake port 18, and opens and closes the intake port 18. The intake valve 21 is a poppet valve. A valve operating mechanism has an intake cam shaft, and is mechanically connected to the intake valves 21. The valve operating mechanism opens and closes the intake valves 21 at a given timing. The valve operating mechanism is a variable valve operating mechanism which varies a valve timing and/or a valve lift. As illustrated in FIG. 2, the valve operating mechanism has an intake S-VT (Sequential-Valve Timing) 23. The intake S-VT 23 continuously changes a rotation phase of the intake cam shaft with respect to the crankshaft 15 within a given angle range. A valve opening period of the intake valve 21 does not change. The intake S-VT 23 is a variable phase mechanism. The intake S-VT 23 is of an electric or hydraulic type.

An exhaust port 19 is formed in the cylinder head 13 for every cylinder 11. The exhaust port 19 communicates with the inside of the cylinder 11.

An exhaust valve 22 is disposed at the exhaust port 19, and opens and closes the exhaust port 19. The exhaust valve 22 is a poppet valve. The valve operating mechanism has an exhaust cam shaft and is mechanically connected to the exhaust valves 22. The valve operating mechanism opens and closes the exhaust valves 22 at a given timing. The valve operating mechanism is a variable valve operating mechanism which varies a valve timing and/or a valve lift. As illustrated in FIG. 2, the valve operating mechanism has an exhaust S-VT 24. The exhaust S-VT 24 continuously changes a rotation phase of the exhaust cam shaft with respect to the crankshaft 15 within a given angle range. A valve opening period of the exhaust valve 22 does not change. The exhaust S-VT 24 is a variable phase mechanism. The exhaust S-VT 24 is of an electric or hydraulic type.

An injector 6 is attached to the cylinder head 13 for every cylinder 11. The injector 6 directly injects fuel into the cylinder 11.

A fuel supply system 61 is connected to the injector 6. The fuel supply system 61 includes a fuel tank 63 which stores the fuel, and a fuel supply line 62 which connects the fuel tank 63 to the injector 6. A fuel pump 65 and a common rail 64 are provided in the fuel supply line 62. The fuel pump 65 pumps the fuel to the common rail 64. The common rail 64 stores the fuel pumped from the fuel pump 65, at a high fuel pressure. When a valve of the injector 6 opens, the fuel stored in the common rail 64 is injected into the cylinder 11 from a nozzle hole of the injector 6. Note that the configuration of the fuel supply system 61 is not limited to the configuration described above.

A spark plug 25 is attached to the cylinder head 13 for every cylinder 11. The spark plug 25 forcibly ignites the mixture gas inside the cylinder 11.

An intake passage 40 is connected to one side surface of the engine 100. The intake passage 40 communicates with the intake port 18 of each cylinder 11. Air introduced into the cylinder 11 flows through the intake passage 40. An air cleaner 41 which filters the air is disposed at an upstream end part of the intake passage 40. A surge tank 42 is disposed near a downstream end of the intake passage 40. The intake passage 40 downstream of the surge tank 42 constitutes independent intake passages which are branched for every cylinder 11. Downstream ends of the independent intake passages are connected to the intake ports 18 of the respective cylinders 11.

A throttle valve 43 is disposed in the intake passage 40, between the air cleaner 41 and the surge tank 42. The throttle valve 43 adjusts an amount of air introduced into the cylinder 11 by being adjusted an opening of its valve.

An exhaust passage 50 is connected to the other side surface of the engine 100. The exhaust passage 50 communicates with the exhaust port 19 of each cylinder 11. The exhaust passage 50 is a passage through which exhaust gas discharged from the cylinder 11 flows. Although the detailed illustration is omitted, an upstream part of the exhaust passage 50 constitutes independent exhaust passages which are branched for every cylinder 11. Upstream ends of the independent exhaust passages are connected to the exhaust ports 19 of the respective cylinders 11.

An exhaust emission control system having a plurality of catalytic converters is disposed in the exhaust passage 50. The upstream catalytic converter has a three-way catalyst 511 and a GPF (Gasoline Particulate Filter) 512, for example. The downstream catalytic converter has a three-way catalyst 513. Note that the exhaust emission control system is not limited to the illustrated configuration. For example, the GPF may be omitted. Further, the catalytic converter is not limited to what has the three-way catalyst. Moreover, the disposed order of the three-way catalysts and the GPF may be changed suitably.

An exhaust gas recirculation (EGR) passage 52 is connected between the intake passage 40 and the exhaust passage 50. The EGR passage 52 is a passage for recirculating a part of exhaust gas to the intake passage 40. An upstream end of the EGR passage 52 is connected between the upstream catalytic converter and the downstream catalytic converter in the exhaust passage 50. A downstream end of the EGR passage 52 is connected between the throttle valve 43 and the surge tank 42 in the intake passage 40.

A water-cooled EGR cooler 53 is disposed in the EGR passage 52. The EGR cooler 53 cools exhaust gas. An EGR valve 54 is also disposed in the EGR passage 52. The EGR valve 54 adjusts a flow rate of exhaust gas which flows through the EGR passage 52. By adjusting the opening of the EGR valve 54, a recirculating amount of external EGR gas can be adjusted.

As illustrated in FIG. 2, the engine system 1 is provided with the ECU (Engine Control Unit) 10 for operating the engine 100. The ECU 10 is a controller based on a well-known microcomputer. The ECU 10 includes a CPU (Central Processing Unit) 101 which executes a program, memory 102 which is comprised of, for example, RAM (Random Access Memory) and ROM (Read Only Memory) and stores the program and data, and an input and output (I/F) circuit 103 which inputs/outputs an electric signal. The ECU 10 is one example of a controller in the present disclosure.

As illustrated in FIGS. 1 and 2, the ECU 10 is connected to various kinds of sensors SW1-SW9. The sensors SW1-SW9 output signals to the ECU 10. The sensors include the following sensors:

Air flow sensor SW1: Disposed in the intake passage 40, downstream of the air cleaner 41, and measuring a flow rate of air which flows through the intake passage 40;

Intake air temperature sensor SW2: Disposed in the intake passage 40, downstream of the air cleaner 41, and measuring the temperature of air which flows through the intake passage 40;

Intake pressure sensor SW3: Attached to the surge tank 42, and measuring the pressure of air introduced into the cylinder 11;

In-cylinder pressure sensor SW4: Attached to the cylinder head 13 corresponding to each cylinder 11, and measuring the pressure inside each cylinder 11;

Water temperature sensor SW5: Attached to the engine 100, and measuring the temperature of coolant;

Crank angle sensor SW6: Attached to the engine 100, and measuring a rotation angle of the crankshaft 15;

Accelerator opening sensor SW7: Attached to an accelerator pedal mechanism, and measuring an accelerator opening corresponding to an operating amount of the accelerator pedal;

Intake cam angle sensor SW8: Attached to the engine 100, and measuring a rotation angle of the intake cam shaft; and Exhaust cam angle sensor SW9: Attached to the engine 100, and measuring a rotation angle of the exhaust cam shaft.

The ECU 10 determines the operating state of the engine 100 based on the signals from the sensors SW1-SW9, and calculates a controlled variable of each device according to the control logic defined beforehand. The control logic is stored in the memory 102, and includes calculating a targeted amount and/or a controlled variable by using a map stored in the memory 102.

The ECU 10 outputs the electric signals according to the calculated controlled variables to the injector 6, the spark plug 25, the intake S-VT 23, the exhaust S-VT 24, the fuel supply system 61, the throttle valve 43, and the EGR valve 54.

The engine 100 is also provided with a starter 7, which is coupled to the crankshaft 15 of the engine 100. The starter 7 is an electric motor. When a driver turns on an ignition switch, the ECU 10 outputs an electric signal to the starter 7. When the starter 7 is turned on, it rotates the crankshaft 15. Then, motoring of the engine 100 is started. After the motoring is started, the ECU 10 outputs the electric signals to the injector 6 and the spark plug 25 to finish the startup of the engine 100.

(Determination of Fuel Property)

The property of the fuel supplied to the fuel tank 63 is not always the same. The property of the fuel supplied to the fuel tank 63 may change greatly compared with a standard fuel.

The memory 102 of the ECU 10 stores a map which is set based on the property of the standard fuel, and the ECU 10 controls the engine 100 by using the map based on the standard fuel. If the property of the fuel supplied to the engine 100 is changed from the property of the standard fuel, it may cause misfire or rapid combustion.

Thus, this engine system 1 determines the property of the fuel supplied to the engine 100. Further, the engine system 1 corrects the controlled variables of the engine 100 according to the determined property of the fuel.

First, a method of determining the fuel property is described with reference to the drawings. The ECU 10 determines the fuel property during the motoring of the engine 100. The motoring of the engine 100 is a state where the starter 7 is rotating the crankshaft 15, and the high-temperature oxidation reaction does not occur inside the cylinder 11. During the motoring of the engine 100, since heat is not generated by the reaction of fuel inside the cylinder 11 and residual combustion gas is not produced, the ECU 10 can determine the property of fuel, without receiving these influences. Therefore, the determination accuracy is improved.

Figure 3:
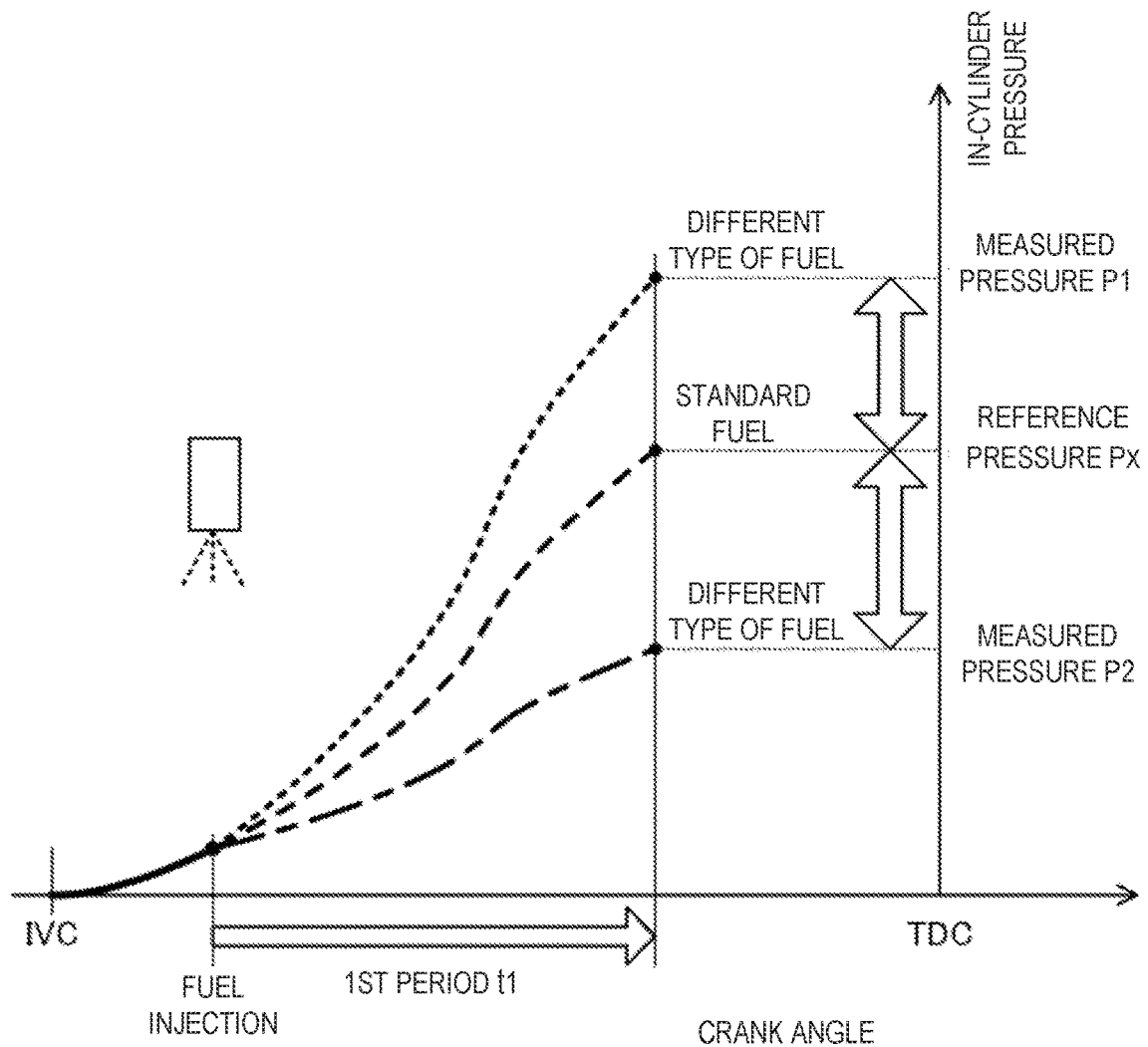
FIG. 3 illustrates a difference in a pressure change inside a cylinder when injecting a plurality of kinds of fuel with different properties.

FIG. 3 illustrates a change of the pressure inside a certain cylinder 11 during the motoring of the engine 100. In FIG. 3, the horizontal axis indicates a progress of the crank angle, and the vertical axis indicates a pressure inside the cylinder 11. As illustrated by a solid line, after the intake valve 21 is closed (i.e., IVC), the pressure inside the cylinder 11 starts to increase as the piston 3 moves upward.

The ECU 10 causes the injector 6 to inject fuel for analysis into the cylinder 11 at a specific timing after IVC. The cylinder 11 to which the fuel is injected may be the cylinder 11 whose intake valve 21 is closed first after the crankshaft 15 starts rotation.

As the cycle of the engine 100 progresses as the first cycle, the second cycle, and so on, the temperature inside the cylinder 11 increases gradually. When the temperature inside the cylinder 11 increases, the heat may affect the determination of the fuel property. By using the cylinder 11 whose intake valve 21 is closed first, the ECU 10 can determine the fuel property, without being influenced by the heat. The determination accuracy of the fuel property improves.

Here, the injector 6 may inject a small amount of fuel with which the high-temperature oxidation reaction does not occur, into the cylinder 11 as the fuel for analysis.

The fuel injected into the cylinder 11 results in the low-temperature oxidation reaction according to the progress of time, inside the cylinder 11 where the pressure increases gradually with the ascent of the piston 3.

Here, if the property of fuel (for example, a ratio of specific heat and/or a gas constant of fuel) differs, the amount of heat released also differs. That is, since the initial chemical reaction is different in a preparatory step of the low-temperature oxidation reaction (for example, the in-cylinder gas temperature is 700K), the amount of heat released is different. The initial chemical reaction is radical (alkylperoxy RO2, QOOHO2) generation by the hydrogen abstraction reaction. The difference in the amount of heat released causes a difference in the rate of pressure increase inside the cylinder 11. A broken line in FIG. 3 illustrates the pressure increase when the standard fuel is injected into the cylinder 11. For the standard fuel, the pressure inside the cylinder 11 at a timing where a first period t1 has passed from the fuel injection timing reaches a reference pressure Px. The first period t1 is an example of a "specific crank angle period" in the present disclosure.

The first period t1 corresponds to a period during which the fuel injected into the cylinder 11 from the injector 6 achieves the low-temperature oxidation reaction. The pressure inside the cylinder 11 at a timing where the first period t1 has passed becomes a pressure to which the amount of heat released in the initial chemical reaction of fuel is reflected. Note that the first period t1 may be a period before the piston 3 inside the cylinder 11 reaches a compression top dead center (TDC).

Contrary to the standard fuel, when a different type of fuel with a different property is injected into the cylinder 11, the rate of pressure increase inside the cylinder 11 is different because the amount of heat released is different. A dotted line in FIG. 3 illustrates the pressure increase when a different type of fuel which is easier to generate heat than the standard fuel is injected into the cylinder 11. Since this type of fuel easily causes the low-temperature oxidation reaction, the pressure increase inside the cylinder 11 is stimulated. The pressure inside the cylinder 11 when the first period t1 has passed (a measured pressure P1) is higher than the pressure of the standard fuel. Further, a one-dot chain line in FIG. 3 illustrates the pressure increase when a different type of fuel which is more difficult to generate heat than the standard fuel is injected into the cylinder 11. Since this type of fuel is difficult to cause the low-temperature oxidation reaction, the pressure increase inside the cylinder 11 is suppressed. The pressure inside the cylinder 11 when the first period t1 has passed (a measured pressure P2) is lower than the pressure of the standard fuel.

The memory 102 stores information on the property of the standard fuel. In more detail, this information is a pressure value (i.e., the reference pressure Px) inside the cylinder 11 when the specific crank angle period (i.e., the first period t1) has passed after the standard fuel is injected into the cylinder 11 at the specific timing.

After the injector 6 injects the fuel for analysis, the ECU 10 acquires the pressure value inside the cylinder 11 when the first period t1 has passed, from the measurement signal of the in-cylinder pressure sensor SW4, and compares this measured pressure P with the reference pressure Px stored in the memory 102. If the measured pressure P matches with the reference pressure Px, the ECU 10 can determine that the property of the fuel injected from the injector 6 matches with the property of the standard fuel. When the measured pressure P is higher than the reference pressure Px, the ECU 10 can determine that the fuel injected from the injector 6 is fuel which is easier to generate heat than the standard fuel. When the measured pressure P is lower than the reference pressure Px, the ECU 10 can determine that the fuel injected from the injector 6 is fuel which is more difficult to generate heat than the standard fuel.

Here, the ECU 10 may determine the fuel property based on the pressure value P measured inside the cylinder 11 whose intake valve 21 is closed first after the crankshaft 15 started rotation. Further, the ECU 10 may measure the pressure value P, not only in the cylinder 11 of which the intake valve 21 is first closed, but also in each of the plurality of cylinders 11 in which a compression stroke takes place thereafter, and may determine the fuel property based on an average value of the plurality of pressure values P. The ECU 10 may measure the pressure values P for 4 to 5 cycles, for example.

When the pressure value P is measured in each of the plurality of cylinders 11, since the piston speed increases as the cycle of the engine 100 during the motoring progresses, the temperature inside the cylinder 11 also increases. When the temperature inside the cylinder 11 increases, since the reaction speed of the fuel injected into the cylinder 11 changes, the pressure when the first period t1 has passed is influenced by the temperature change inside the cylinder 11.

Figure 4:
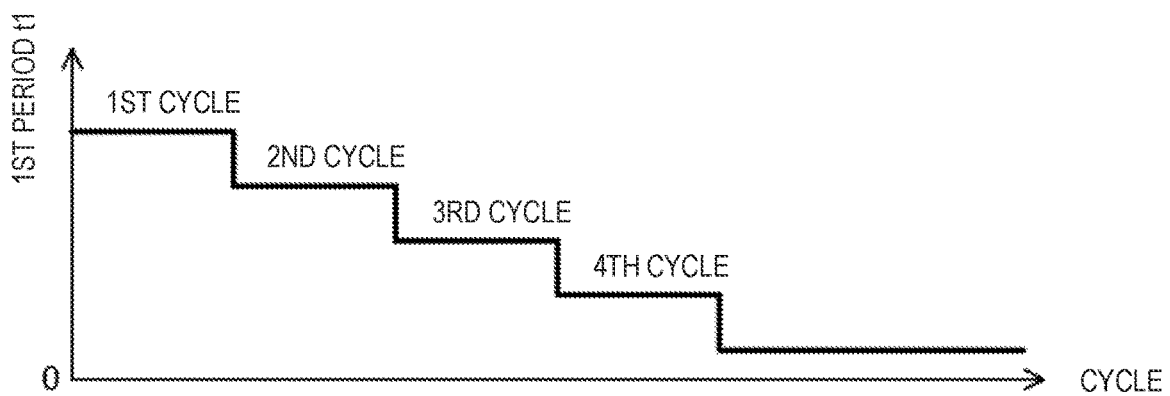
FIG. 4 illustrates a relationship between a progress of a cycle and a first period of a pressure value.

Thus, the ECU 10 may change the length of the first period t1 according to progress of the cycle of the engine 100. FIG. 4 illustrates a relationship between the progress of the cycle of the engine 100 and the length of the first period t1. The length of the first period t1 becomes shorter gradually as the cycle of the engine 100 progresses as the first cycle, the second cycle, the third cycle, and the fourth cycle. By doing so, the influence of the temperature inside the cylinder 11 gradually increasing can be eliminated, and therefore, the ECU 10 can determine the difference in the pressure increase inside the cylinder 11 only resulting from the fuel property.

(Control of Engine According to Fuel Property)

After the startup of the engine 100 is finished, the ECU 10 operates the engine 100, while correcting the injection amount of the fuel and/or the close timing of the intake valve 21 (IVC) according to the determined property of the fuel. Thus, even if the property of fuel differs, it can make the combustion equivalent to the combustion with the standard fuel, and therefore, it becomes advantageous for the improvement in fuel efficiency of the engine 100 and the improvement in emission gas performance. Further, the increase in combustion noise can be suppressed.

Figure 5:
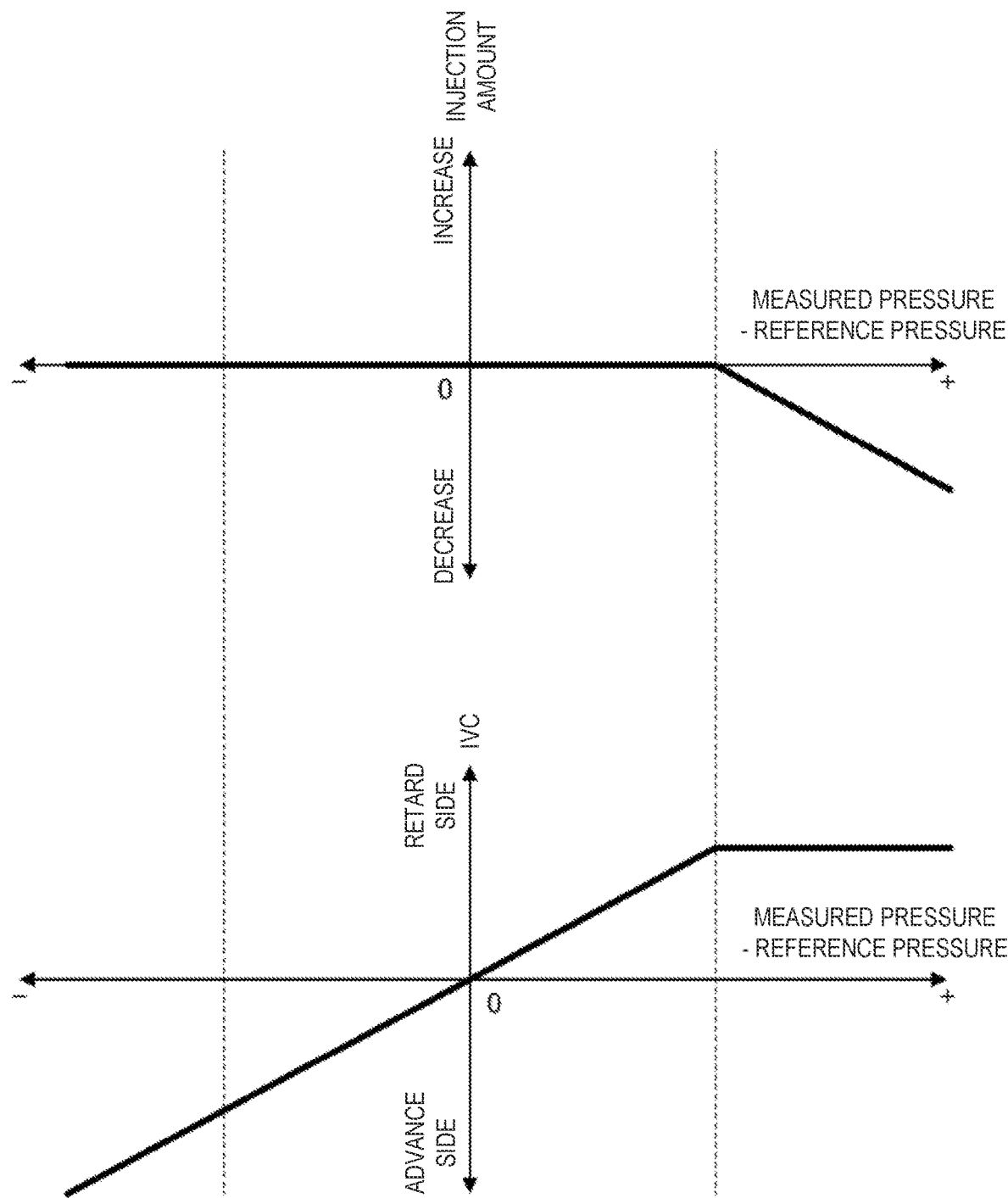
FIG. 5 illustrates a correction map of a fuel injection amount and a valve close timing of an intake valve.

FIG. 5 illustrates a correction map (upper figure) for the fuel injection amount and a correction map (lower figure) for the valve close timing. These correction maps are stored in the memory 102 of the ECU 10. In each correction map, the horizontal axis is a value of {measured pressure}−{reference pressure}, where the left side (i.e., negative) in this drawing indicates that the measured pressure P is lower than the reference pressure Px, and the right side (i.e., positive) in this drawing indicates that the measured pressure P becomes higher than the reference pressure Px.

When the measured pressure P is higher than the reference pressure Px, this fuel is relatively easy to generate heat. Thus, as illustrated in the lower figure of FIG. 5, the ECU 10 corrects the close timing of the intake valve 21 to the retarding side through the intake S-VT 23. When the close timing of the intake valve 21 is retarded, since the temperature inside the cylinder 11 drops, the fuel becomes difficult to generate heat. Even if it is the fuel which is easy to generate heat, this combustion becomes equivalent to the combustion with the standard fuel. Note that the close timing of the intake valve 21 is set after an intake bottom dead center.

On the contrary, when the measured pressure P is lower than the reference pressure Px, this fuel is relatively difficult to generate heat. Thus, as illustrated in the lower figure of FIG. 5, the ECU 10 corrects the close timing of the intake valve 21 to the advancing side through the intake S-VT 23. When the close timing of the intake valve 21 is advanced, since the temperature inside the cylinder 11 increases, the fuel becomes easier to generate heat. Even if it is the fuel which is difficult to generate heat, this combustion becomes equivalent to the combustion with the standard fuel.

In more detail, the control map of the lower figure of FIG. 5 illustrates the configuration to correct so that the close timing of the intake valve 21 is retarded when the measured pressure P becomes higher than the reference pressure Px, and to correct so that the close timing of the intake valve 21 is advanced when the measured pressure P becomes lower than the reference pressure Px. Thus, the temperature inside the cylinder 11 is adjusted to a temperature according to the fuel property.

Here, there is a limit for the retarding amount of the close timing of the intake valve 21, and therefore, even if the close timing of the intake valve 21 is retarded exceeding the maximum retarding amount, the temperature inside the cylinder 11 is difficult to be further dropped. Thus, when the valve close timing reaches the maximum retard amount in the control map illustrated in the lower figure of FIG. 5, the ECU 10 corrects so that fuel injection amount decreases when the measured pressure P becomes higher than the reference pressure Px, as illustrated in the upper figure of FIG. 5. Since the calorific value falls by the reduction in the fuel injection amount, this combustion becomes equivalent to the combustion with the standard fuel.

(Control Flow)

Figure 6:
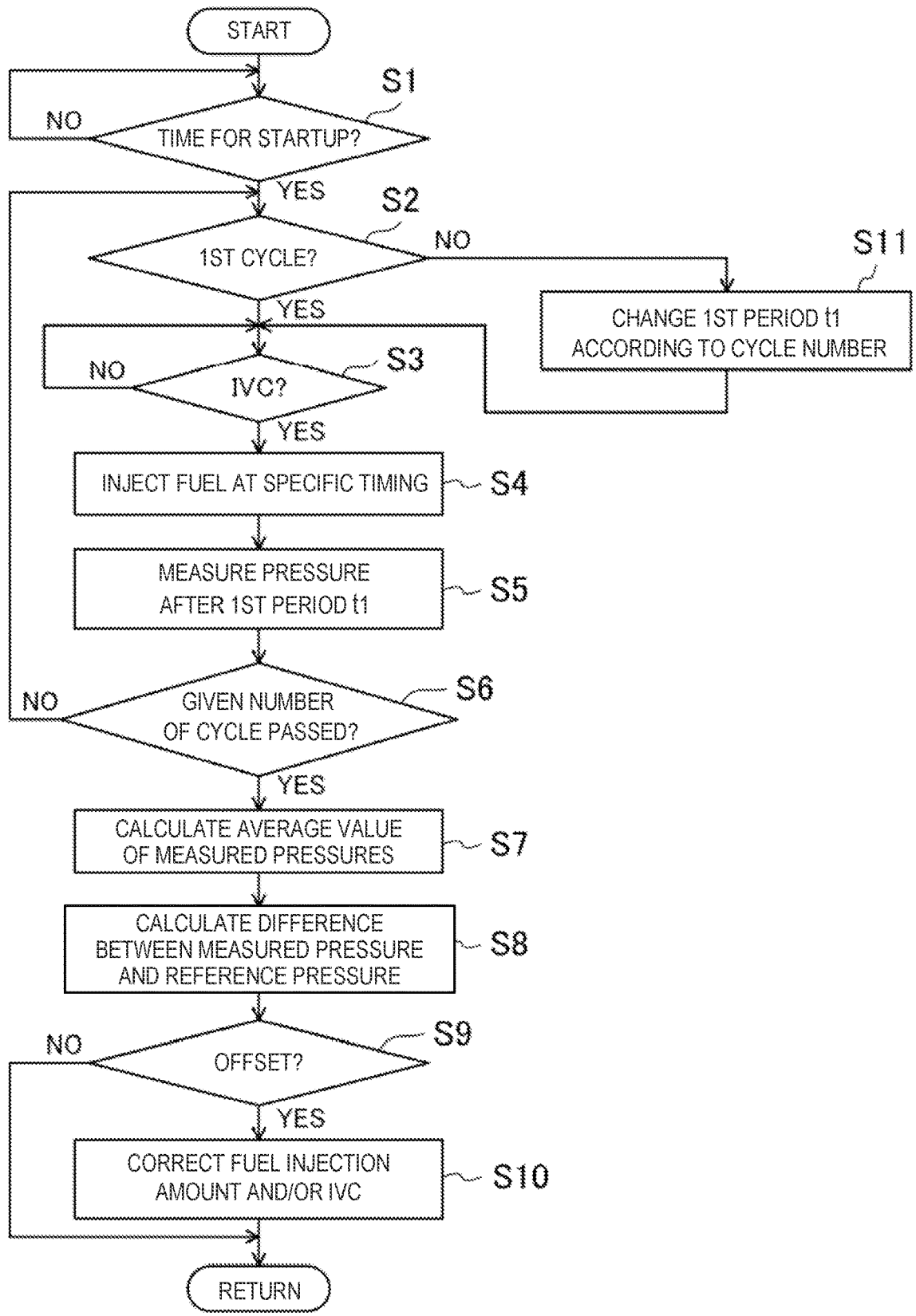
FIG. 6 illustrates a control flow of the engine system executed by a controller.

Next, a procedure of the control executed by the ECU 10 is described with reference to a flow of FIG. 6. First, after the start, at Step S1, the ECU 10 determines whether it is time for starting the engine 100. If not the time for a startup, the process repeats Step S1, and if it is the time for a startup, the process shifts to Step S2.

At Step S2, the ECU 10 determines whether the number of cycle is the first cycle since the crankshaft 15 started rotation. If it is the first cycle, the process shifts to Step S3, and if it is the second or subsequent cycle, the process shifts to Step S11.

At Step S3, the ECU 10 determines whether the intake valve 21 is closed in the cylinder 11 which is a target for injecting the fuel for analysis. Note that if the number of cycle is the first cycle, it is the intake valve 21 which is first closed after the crankshaft 15 started rotation. If the determination at Step S3 is NO, the process repeats Step S3, and if the determination at Step S3 is YES, the process shifts to Step S4.

At Step S4, the ECU 10 causes the injector 6 to inject the fuel for analysis at a specific timing after the intake valve 21 is closed, at the subsequent Step S5, the ECU 10 acquires the pressure inside the cylinder 11 at a timing the first period t1 has passed from the fuel injection timing, based on the measurement signals from the in-cylinder pressure sensor SW4 and the crank angle sensor SW6.

At Step S6, the ECU 10 determines whether a given number of cycles has passed since the motoring of the engine 100 was started. This given number of cycles is the number of cycles for performing the pressure measurement, and it may be 4 to 5 cycles, for example. If the determination at Step S6 is NO, the process returns to Step S2.

At Step S2, if it is the second or subsequent cycle, the process shifts to Step S11. After the ECU 10 changed the first period t1 according to the map in FIG. 4, the ECU 10 performs Steps S3-S5. In this way, the fuel injection into the cylinder 11 and the pressure measurement are repeated a plurality of times.

If the determination at Step S6 becomes YES, the process shifts to Step S7. The ECU 10 calculates an average value of the plurality of measured pressure values, and at the subsequent Step S8, it calculates a difference between the measured pressure and the reference pressure according to the standard fuel. Further, at Step S9, the ECU 10 determines whether there is an offset between the measured pressure and the reference pressure, and if there is an offset, the process shifts to Step S10. At Step S10, according to the control map in FIG. 5, the ECU 10 corrects the fuel injection amount and/or the close timing of the intake valve 21 after the startup of the engine 100 is finished, based on the fuel property. On the other hand, if there is no offset, the ECU 10 does not correct the fuel injection amount and the close timing of the intake valve 21.

According to the method of controlling the engine 100 and the engine system 1 disclosed herein, the ECU 10 can determine the fuel property with sufficient accuracy because the fuel for analysis is injected into the cylinder 11 in the compression stroke, during motoring of the engine 100.

Further, since the combustion under operation of the engine 100 becomes equivalent to the combustion with the standard fuel by correcting the controlled variables of the engine 100 according to the determined property of the fuel, the improvement in fuel efficiency and the improvement in emission gas performance are achieved. In addition, the increase in combustion noise can be suppressed.

Note that the technique disclosed herein is not limited to being applied to the engine system 1 having the configuration described above. The technique disclosed herein is applicable to engine systems 1 of various configurations. For example, the technique disclosed herein is also applied to diesel engines.

Further, the technique disclosed herein is also applicable to so-called "hybrid vehicles." In this case, the engine motoring may be performed by a generator. Further, in the hybrid vehicle, an engine may be started in response to a power generation demand or a torque demand. The ECU 10 may determine the fuel property, when the engine is started, according to the power generation demand or the torque demand.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Engine System
10 ECU (Controller)
100 Engine
11 Cylinder
15 Crankshaft
21 Intake Valve
6 Injector
SW4 In-cylinder Pressure Sensor
SW6 Crank Angle Sensor

What is claimed is:

1. A method of controlling an engine, comprising the steps of:
   during motoring of the engine, injecting, by an injector, fuel for analysis into a cylinder at a specific timing after an intake valve of the cylinder of the engine is closed;
   outputting to a controller, by an in-cylinder pressure sensor, a signal corresponding to a pressure inside the cylinder at least at a timing when a specific crank angle period has passed from the fuel injection timing; and
   determining, by the controller, a property of the fuel injected by the injector, by comparing a pressure value measured by the in-cylinder pressure sensor with a reference pressure value inside the cylinder measured at a timing when the specific crank angle period has passed after a standard fuel is injected into the cylinder at the specific timing, wherein
   the cylinder is one of a plurality of cylinders,
   the cylinder into which the injector injects the fuel for analysis is the cylinder, out of the plurality of cylinders, whose intake valve is closed first after a crankshaft of the engine starts rotation,
   for each of the plurality of cylinders, the injector injects the fuel for analysis as a cycle of the engine progresses,
   a corresponding plurality of in-cylinder pressure sensors for the plurality of cylinders output the pressure values of the plurality of cylinders,
   the controller compares an average value of the plurality of pressure values with the reference pressure value to determine the property, and
   the specific crank angle period is set to be shorter as the cycle progresses such that the pressure value is measured without an effect of temperature increase inside the cylinder.

2. The method of claim 1, wherein the specific crank angle period corresponds to a period during which the fuel injected into the cylinder from the injector achieves a combustion reaction at an in-cylinder temperature of 700 K.

3. The method of claim 2, wherein after a startup of the engine is finished, the controller corrects at least one of a fuel injection amount and a close timing of the intake valve according to the property of the fuel.

4. The method of claim 3, wherein the controller corrects the close timing of the intake valve to a retarding side when the measured pressure value is higher than the reference pressure value, and corrects the close timing of the intake valve to an advancing side when the measured pressure value is lower than the reference pressure value.

5. The method of claim 4,
   wherein the controller corrects the close timing of the intake valve so that the close timing of the intake valve is retarded more when the measured pressure value becomes higher than the reference pressure value, and
   wherein when the valve close timing reaches a maximum retard amount, the controller corrects the fuel injection amount so that the fuel injection amount decreases when the measured pressure value becomes higher than the reference pressure value.

6. The method of claim 1, wherein after a startup of the engine is finished, the controller corrects at least one of a fuel injection amount and a close timing of the intake valve according to the property of the fuel.

7. The method of claim 1, wherein the controller corrects a close timing of the intake valve to a retarding side when the measured pressure value is higher than the reference pressure value, and corrects the close timing of the intake valve to an advancing side when the measured pressure value is lower than the reference pressure value.

8. The method of claim 7,
   wherein the controller corrects the close timing of the intake valve so that the close timing of the intake valve is retarded more when the measured pressure value becomes higher than the reference pressure value, and
   wherein when the valve close timing reaches a maximum retard amount, the controller corrects the fuel injection amount so that the fuel injection amount decreases when the measured pressure value becomes higher than the reference pressure value.

9. The method of claim 6, wherein the controller corrects the close timing of the intake valve to a retarding side when the measured pressure value is higher than the reference pressure value, and corrects the close timing of the intake valve to an advancing side when the measured pressure value is lower than the reference pressure value.

10. The method of claim 9,
    wherein the controller corrects the close timing of the intake valve so that the close timing of the intake valve is retarded more when the measured pressure value becomes higher than the reference pressure value, and
    wherein when the valve close timing reaches a maximum retard amount, the controller corrects the fuel injection amount so that the fuel injection amount decreases when the measured pressure value becomes higher than the reference pressure value.

11. An engine system including an engine, comprising:
a controller that stores information regarding a property of a standard fuel;
an injector that injects fuel into a cylinder of the engine, in response to a control signal from the controller;
an in-cylinder pressure sensor that is attached to the engine, and outputs to the controller a pressure signal corresponding to a pressure inside the cylinder; and
a crank angle sensor that is attached to the engine, and outputs to the controller a crank angle signal corresponding to a crank angle of the engine,
wherein during motoring of the engine, the controller causes the injector to inject fuel for analysis at a specific timing after an intake valve of the cylinder is closed,
wherein the controller acquires a pressure value inside the cylinder at a timing when a specific crank angle period has passed from the fuel injection timing, based on the crank angle signal of the crank angle sensor and the pressure signal of the in-cylinder pressure sensor,
wherein the information stored in the controller includes a reference pressure value inside the cylinder at a timing when the specific crank angle period has passed after the standard fuel is injected into the cylinder at the specific timing,
wherein the controller determines the property of the fuel injected by the injector, based on a comparison of the acquired pressure value with the reference pressure value,
wherein the cylinder is one of a plurality of cylinders,
wherein the cylinder into which the injector injects the fuel for analysis is the cylinder, out of the plurality of cylinders, whose intake valve is closed first after a crankshaft of the engine starts rotation,
wherein, for each of the plurality of cylinders, the injector injects the fuel for analysis as a cycle of the engine progresses,
wherein a corresponding plurality of in-cylinder pressure sensors for the plurality of cylinders output the pressure values of the plurality of cylinders,
wherein the controller compares an average value of the plurality of pressure values with the reference pressure value to determine the property, and
wherein the specific crank angle period is set to be shorter as the cycle progresses such that the pressure value is measured without an effect of temperature increase inside the cylinder.

\* \* \* \* \*